United States Patent
Helmrich

(10) Patent No.: US 11,575,807 B2
(45) Date of Patent: Feb. 7, 2023

(54) OPTICAL DEVICE FIELD OF VIEW CLEANING APPARATUS

(71) Applicant: Monomer Software LLC, Brandon, FL (US)

(72) Inventor: Harry J. Helmrich, Brandon, FL (US)

( * ) Notice: Subject to any disclaimer, the term of this patent is extended or adjusted under 35 U.S.C. 154(b) by 0 days.

(21) Appl. No.: 17/152,080

(22) Filed: Jan. 19, 2021

(65) Prior Publication Data

US 2021/0227113 A1 Jul. 22, 2021

Related U.S. Application Data

(60) Provisional application No. 62/963,321, filed on Jan. 20, 2020.

(51) Int. Cl.
 *H04N 5/335* (2011.01)
 *H04N 5/225* (2006.01)

(52) U.S. Cl.
 CPC ....... *H04N 5/22521* (2018.08); *H04N 5/2252* (2013.01); *H04N 5/2254* (2013.01)

(58) Field of Classification Search
 CPC .......................... H04N 5/2251; H04N 5/2171
 See application file for complete search history.

(56) References Cited

U.S. PATENT DOCUMENTS

| | | | |
|---|---|---|---|
| 6,607,606 B2 | 8/2003 | Bronson | |
| 8,899,761 B2 | 12/2014 | Tonar et al. | |
| 9,126,534 B2 | 9/2015 | Snider | |
| 9,602,703 B1 | 3/2017 | Raphael | |
| 9,880,382 B1 * | 1/2018 | Tippy | G02B 27/0006 |
| 10,266,126 B2 | 4/2019 | Suman et al. | |
| 10,604,121 B2 * | 3/2020 | Blank | B60S 1/56 |
| 2012/0238818 A1 * | 9/2012 | O'Prey | A61B 46/17 600/121 |
| 2014/0376089 A1 * | 12/2014 | Haberer | B81B 7/0067 359/511 |
| 2016/0121855 A1 | 5/2016 | Doorley et al. | |
| 2017/0151933 A1 | 6/2017 | Doorley et al. | |

(Continued)

FOREIGN PATENT DOCUMENTS

| | | |
|---|---|---|
| CN | 1175944 | 11/2004 |
| CN | 102466174 A * | 5/2012 |

(Continued)

OTHER PUBLICATIONS

CMM110 Surveillance Camera CCTV Lens Cleaning System, Shop | Mud Muncher Motorized Tear Off System, https://motorizedtearoff.com/shop-1?olsPage=products%2Fsurveillance-camera-lens-cleaning-system&page=4, Copyright © 2019 Mud Muncher Motorized Tear Off System, Powered by GoDaddy GoCentral Website Builder, Aug. 26, 2019, pp. 1-2.

(Continued)

*Primary Examiner* — Gary C Vieaux
(74) *Attorney, Agent, or Firm* — Eric Hanscom

(57) ABSTRACT

The invention relates to a method and apparatus for keeping the field of view of an optical device (camera, laser, etc.) clean and unobstructed from dirt, contaminants, dust, chemicals, or other physical or chemical obstructions that hinder the performance of the optical device and, more particularly it employs a sacrificial transparent film positioned in front of and radially around a transparent main cylinder, within which an optical device is to be located.

18 Claims, 11 Drawing Sheets

(56) References Cited

U.S. PATENT DOCUMENTS

2018/0080864 A1\* 3/2018 Rowe ................... G01V 8/02
2019/0025773 A1\* 1/2019 Yang .................. G06N 3/0454
2019/0242980 A1\* 8/2019 Collins ................ G01S 7/4813

FOREIGN PATENT DOCUMENTS

CN 102131045 B \* 7/2012
GB 2535862 A \* 8/2016 ............... G02B 1/18

OTHER PUBLICATIONS

Self-Sucient, Self-Cleaning Cameras for Harsh and Dirty Environments, Introducing ToughEye™ Easy Installation, Sophisticated Results, Self-Cleaning Cameras | ExcelSense Technologies Corp. | Burnaby, https://www.excelsensetechnologies.com, Aug. 26, 2019, pp. 1-6.

Self Cleaning Camera Dome (Option), Self-Cleaning Dome Washing System With Programmable Cleaning Schedules, The World's Only Patented Self-Cleaning System Consistently Yields Clear Image Quality During Wet, Dirty and Harsh Weather Conditions, © 2019 X Stream Designs, Inc., https://www.xstreamdesigns.com/tab/self-cleaning, Aug. 26, 2019, pp. 1-4.

Automatic Tear Off—Mud Muncher Motorized Tear Off System _ Mud Muncher Motorized Tear Off System.pdf, https://www.youtube.com/watch?v=h2J25g1K79g, Aug. 26, 2019.

\* cited by examiner

OPTICAL DEVICE FIELD OF VIEW CLEANING APPARATUS

CROSS-REFERENCE TO RELATED APPLICATION

This application claims priority from U.S. Provisional Patent Application No. 62/963,321, filed Jan. 20, 2020, titled SELF-CLEANING CAMERA APPARATUS which is hereby incorporated by reference herein for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention and the applicants make no claim to any trademarks referenced.

BACKGROUND OF THE INVENTION

1) Field of the Invention

The invention relates to a method and apparatus for keeping the field of view of an optical device (camera, laser, etc.) clean and unobstructed from dirt, contaminants, dust, chemicals, or other physical or chemical obstructions that hinder the performance of the optical device.

2) Description of Related Art

There are a variety of optical devices that use lenses/optical paths. Such devices include devices that receive images, such as video cameras and video monitors, and also include devices that project images, such as video projectors. Some optical devices are used by placing them in remote locations for use without a person attending the optical device, such as a video camera positioned at a strategic vehicle traffic intersection or such as a video projector positioned at the ceiling of a conference room or such as a motion picture projector positioned at a projection room of a movie theater. Other examples of cameras that are located remotely are the so-called "web cameras" or "webcams" which are accessible through the internet and which permit viewers to visit live scenes at innumerable locations throughout the world.

Many of these cameras are used in industrial applications where there exists the issue of contaminant particles such as chemical vapors which can both obstruct or damage the transparent glass or plastic view window. Rain, dust, dirt, insects and insect excreta, etc., may become deposited on the lens of an optical device, and such deposit may occur, for example, by the action of gravity or by air currents such as wind. Such contaminants are undesired since they impair the optical path of the optical device, in other words, the contaminants cause the received or projected image to lose its optical fidelity, and the contaminants may become visible on the image. Accordingly, it is desired that the cleanliness of lenses/optical paths of optical devices be maintained, that is, it is desired that lenses/optical paths be kept free of contaminants.

In the prior art, optical devices are often placed in and protected by housings for protection of the camera from the elements of nature such as chemical vapors, rain, dust, wind, birds, insects and so forth. The housings may be constructed of materials such as metal, plastic, and so forth. The housings also need to have a transparent glass or plastic view window which is optically transparent. The camera that is housed within housing and the camera lens is behind the transparent glass or plastic view window, thus the lens and camera is protected from the elements and from contaminants by transparent glass or plastic view window and the housing.

Examples of impaired field of views can be observed when one looks at an image of a remotely mounted industrial, traffic or security camera. While the housing and the transparent glass or plastic view window protects the optical device from contaminants the problem then becomes one of maintaining the cleanliness of the transparent glass or plastic view window rather than maintaining the cleanliness of the lens. The contaminants will collect on the transparent glass or plastic view window but are nonetheless visible in the field of view since the quality of the image depends upon the cleanliness of the transparent glass or plastic view window.

The simple solution of the prior art would be to manually clean contaminants from lenses/optical paths or the transparent glass or plastic view window when the deposits become noticeable or to clean the lenses/optical paths of the transparent glass or plastic view window on a scheduled basis, but this is a non workable solution due to labor and access.

An alternate solution found in the prior art is used in the automobile racing field and features shields which are provided with lateral reciprocating motion to cause wiping by wipers that are located outside of the field of view of lens. The shields of the prior art are moved back and forth and are moved sufficiently far as to cause contaminants to be wiped by wipers that may be stationary, but which are located out of the field of view of the lens. The limitation is that contaminants may not be completely removed by the wipers and the contaminants may travel back and forth across the field of view. Moreover, the reciprocating motion of the shield of this prior art may cause annoyance to the viewer.

From the limitations in the prior art that are described above, it can be seen that there is a need to improve the ways for maintaining the cleanliness of the lens shield of optical devices that are protected by a housing.

BRIEF SUMMARY OF THE INVENTION

The instant invention in one form is directed to a method and apparatus for keeping the field of view of an optical device (camera, laser, etc.) clean and unobstructed from dirt, contaminants, dust, chemicals, or other physical or chemical obstructions that hinder the performance of the optical device.

The instant invention employs a sacrificial transparent film positioned in front of and radially around a transparent main cylinder, within which an optical device is located. The cylinder can be replaced by any geometric enclosure which protects the optical device such as but not limited to a transparent box, transparent polygon, transparent tetrahedron, transparent wall, transparent cube, transparent triangular prism, transparent dodecahedron, transparent icosahedron or transparent sphere.

The instant invention in another form provides a device to index the sacrificial transparent film using a rotation mechanism to rotate a cylinder or spool connected to the transparent film. The sacrificial transparent film is a long strip of polymetric material such as polyester, polyvinyl chloride, cellulose acetate, cellophane, Mylar®, Grafix Clear-Lay® or polypropylene that is wrapped around the main cylinder housing the optical device or apparatus. When the first spool rotates, it pulls the film across the transparent main cylinder such that a new, clean section of film material becomes located in front of the field of view of the optical device.

In yet another form, the instant invention main cylinder and the sacrificial transparent film rotation mechanism provides a path which ensures the sacrificial transparent film is always in contact with the main cylinder, housing the optical device thereby shielding the main cylinder to prevent damage to the main cylinder and ensure optical transparency of the main cylinder.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
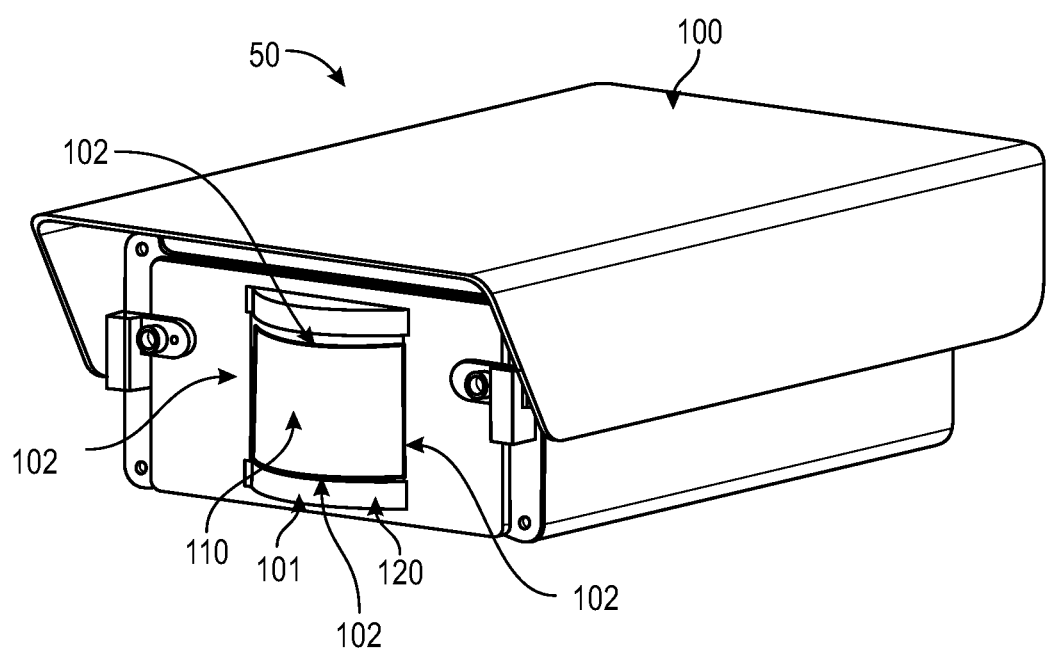
FIG. 1 is an assembly view showing exposed sacrificial transparent film over the main cylinder.

The instant invention utilizes the terms non-sacrificial transparent main cylinder and transparent main cylinder interchangeably.

The term front refers to the direction in which the camera lens or optical path is facing.

The instant invention uses sacrificial transparent film, transparent film and film interchangeably.

The term optical device refers to a camera capable of creating a digital representation of the objects in the field of view, a laser device used to measure or sense objects in the field of view or an infrared sensor used to sense objects in the field of view.

The term transparent film as used in the disclosure is used to describe any transparent film made from radar transparent materials, laser transparent materials, optically clear materials, Polyester, PET, Polyethylene, Polypropylene, Polyvinyl Chloride, Cellulose Acetate, Cellophane, or similar other clear material.

The terms instrument, camera, infra-red detector Lidar, Lidar and radar are used interchangeably in the specification to mean an instrument used to observe, measure, or compare objects within the range of the instruments field of view.

The terms lenses and optical paths are used to more generally refer to an optical, radar or infrared transparent cover. Sensors like LiDAR do not use lenses or an optical path, so a transparent or nearly transparent medium is used in these applications.

The term window as used in the specification means any opening which can be covered with a transparent medium or uncovered.

The term image as used in this specification can mean a digital image or a digital data set captured by an instrument, camera, infra-red detector, LiDAR, or radar device and these terms are used interchangeably.

The term microprocessor as used in the specification refers to any computing hardware that is or may include integrated circuits or components capable of performing logic tasks or computations. When this term is used herein, it may refer to a microprocessor, microcomputer, microcontroller, CPU, GPU, FPGA, or other similar device.

The term cloud as used in this specification can mean a remote cloud system including databases and applications, a cloud network of devices or local remote computing device which is remote to the device of the instant invention, which may include a processor and associated applications and databases.

The term cylinder as used in this specification can mean any geometric enclosure which protects the optical device such as but not limited to a transparent box, transparent polygon, transparent tetrahedron, transparent wall, transparent cube, transparent triangular prism, transparent dodecahedron, transparent icosahedron or transparent sphere.

In the prior art, there are solutions which utilize wipers and cleaning solutions which clean the transparent glass or plastic view window such as Chinese patent CN1175944C, U.S. Pat. No. 6,607,606, U.S. patent Ser. No. 10/266,125, U.S. Pat. Nos. 9,602,703, 8,899,761 and U.S. Pat. Application 20170151933 which are hereby incorporated by reference.

The instant invention is a method and apparatus for keeping the field of view of an optical device (camera, laser, etc.) clean and unobstructed from dirt, contaminants, dust, chemicals, or other physical or chemical obstructions that hinder the performance of the optical device. This invention employs a sacrificial transparent film positioned in front of and radially around a transparent main cylinder, within which an optical device is to be located. A rotation mechanism is used to rotate a cylinder or spool connected to the transparent film. The transparent film is a long strip of material wrapped around a cylinder or spool (separate from the cylinder or spool connected to the rotating mechanism). When the first spool rotates, it pulls the film across the transparent main cylinder such that a new, clean section of film material becomes located in front of the field of view of the optical device. Each spool has a core which allows the transparent film to communicate with the spool such that the spool wraps around the dirty spool and unwraps around the clean spool.

The current issues associated with the prior art that the instant invention addresses are situations where cameras (or other optical equipment) are located in areas that have dust, dirt, and other physical contaminants, or chemical gases, vapors, fumes, which may chemically alter the camera lens or other protective shield. In industrial settings, such a chemical facility, chemical vapors can render optical devices useless in as little as 2 weeks. Current innovations attempt to keep the optical device's field of view clean using a variety of methods. One method is to use wipers that actuate reciprocally over a transparent window. The disadvantage of this solution is that the wiper can obstruct the field of view when it is reciprocating. There are also difficulties in cleaning oily or greasy contaminants with a wiper, since these contaminants tend to smear and not be fully removed from the field of view. Other methods are by actuating a transparent shield in a reciprocal manner such that the contaminants are scraped or brushed off the shield. The issues with this method are similar to the first method in that greasy and oily contaminants are difficult to remove. Furthermore, both of these methods do not address the issue of chemical etching, which cannot simply be cleaned by physical cleaning methods. For this reason, the instant invention disclosed uses a sacrificial transparent film. Other prior art such as those used in the motorsports racing industry, attempt to use a similar transparent film; however, the implementation is not suitable or useful in a harsh chemical environment because these implementations typically rely on rubber, cloth, or other similar gasket material being used between the film and the main housing, and these gaskets are often the first to fail in harsh chemical environments. The instant invention prevents chemical vapors and gasses from reacting with non-sacrificial transparent materials in the field of view of the optical sensor by creating a virtual seal accomplished by wrapping the sacrificial transparent film around the majority of the non-sacrificial transparent main cylinder. This minimizes the area of potential attack of harsh chemical substances thereby limiting the path by which chemical vapors can migrate between the sacrificial transparent film and the non-sacrificial cylinder where they can interfere with the optical field of view. The invention could also be configured to be a singular device that has a transparent sacrificial transparent film with vibrating motors, connections for air, connections for cleaning fluid, and an attachment for a physical wiper. These secondary mechanisms provide alternative solutions to remove the many different types of contaminants which can affect the field of view. By providing these different solutions the instant invention can improve the time between maintenance task by utilizing multiple methods of keeping the sacrificial transparent film or optical, laser or radar path clean. The instant invention therefore can be configured to have only a sacrificial transparent film and nothing else and it can also incorporate a combination of multiple methods of cleaning into one device. This provides the customer significant advantages to utilize the technology for cleaning the camera/instrument view path.

The housing of the instant invention is an enclosure which contains the optical device and related electrical components, internal wires, and the mechanism for rotating the sacrificial transparent film. It may be made out of metal, plastic, or other materials. The housing allows for data wires and power wires to pass through from the outside to the electrical equipment inside the housing. The enclosure is sealed in such a way as to prevent water or foreign gases/fluids from entering into the housing. The instant invention utilizes a suitable sealing technology to seal the housing such as caulking, O-rings, seals, gaskets or adhesive.

The mechanism and apparatus containing the sacrificial transparent film is located on the side of the housing that also contains the optical device/instrument which can be a camera, fiber optics lens or other system designed to provide a remote view of the area under surveillance. The optical device/instrument can also be a Lidar, Radar, infrared detection device or sonar. The optical device is located within an optically transparent main cylinder which can also be any shape such as a sphere, polygon or hexagon shape that permits the sacrificial transparent film to remain in tight contact or communication with the optically transparent main cylinder. The optically transparent main cylinder is positioned such that the optical device's field of view passes through the sacrificial transparent film and the optically transparent main cylinder. As used in this specification this side of the housing will be referred to as the "front" of the housing.

The optical device is located inside a transparent main cylinder. The transparent main cylinder can be made of glass or plastic or other suitable material. Typically, the optical device, which in most cases is a camera/sensor, has its own lens. This camera/sensor and lens are entirely enclosed within this transparent main cylinder. The camera/sensor can be a camera, an infra-red detector, a lidar detector, radar detector or sonar detector.

When looking at the main cylinder, camera sensor, and film spools from the top down, the main cylinder can be thought of as a clock face, the 2 spools are preferably located at approximately 5 o'clock and 7 o'clock. However, any suitable position can be used. The sacrificial transparent film is wrapped around the main cylinder with the film contacting the surface of the main cylinder anywhere between 15 to 300 degrees depending on the installation location, optical device configuration, or type and/or nature of contamination anticipated. The sacrificial transparent film wrap is preferably 300 degrees. The sacrificial transparent film wraps around the main cylinder from 5 o'clock position to the top (12 o'clock) position and back around to 7 o'clock position. It may be possible for the spools to exist at different locations (such as 3 o'clock and 9 o'clock), but the 5 o'clock to 7 o'clock (300 degree) locations provide the most coverage of the film to protect the transparent main cylinder. By wrapping as much of the transparent main cylinder in sacrificial transparent film as possible, the protective nature of the sacrificial transparent film is maximized to prevent chemically etching materials and gases from contacting transparent main cylinder which could result in a degraded view. When looking from the top down, the dirty spool with the motor or drive rotating mechanism of the preferred embodiment provides the mechanism to pull the sacrificial transparent film around the transparent main cylinder. The motor or drive rotating mechanism is preferably a motor. However, a ratcheting linear drive could be used. The dirty spool which can also be referred to as the take up spool, may be located at either of the 2 positions and depends on the construction of the device. The other spool, which can also be referred to as the clean spool or supply spool, is located at the other position. If the clean spool is located at the 5 o'clock position, then the sacrificial transparent film will be wrapped around it in a clockwise fashion from the innermost part of the clean spool outward, such that the sacrificial transparent film exits the clean spool at the left side of the spool before being pulled across the transparent main cylinder which is the preferred direction of indexing the transparent film. The sacrificial transparent film may alternatively be wrapped around the spool in the opposite direction, such that the film exits the spool at the top before being pulled across the transparent main cylinder. However, the preferred embodiment has been shown to provide the maximum contact between the film and the transparent main cylinder.

The goal of the film is to not only capture all contaminants, but to also protect chemical gases and fluids from being in communication with the transparent main cylinder. The transparent main cylinder may protrude forward from the front face of the housing depending on the optical needs of the optical device, such as a fisheye lens which may be obstructed by the housing if transparent main cylinder was not protruding from it. The sacrificial transparent film can alternatively be retained around the transparent main cylinder by placing wipers which force the sacrificial transparent film to come in contact with the transparent main cylinder.

The motor or drive that rotates the dirty spool, may be directly connected to the spool, connected by a gearbox, connected by a belt or pulley drive, or may be connected by any other method that can cause the spool to rotate. In one embodiment, the motor or drive is able to rotate continuously (not reciprocally) as the sacrificial transparent film will be wrapped around the transparent main cylinder many times over during the life of the film. The dirty spool is rotated when the motor or drive is activated which wraps the sacrificial transparent film rotatably around the transparent main cylinder and around the core of the dirty spool and as it does this the supply roll releases the additional film. In some installations, to save space, the motor may be physically located almost entirely inside the dirty spool, although it may be possible that the motor is located entirely above or adjacent to the dirty spool. The motor/drive is only to actuate a small amount, enough to move enough film so the dirty portion of the film is no longer in the field of view of the optical device. This may be as little as 0.05 to 3 inches, or greater, depending on the size of the optical sensor and where the field of view lies.

In some scenarios it is beneficial to actuate the motor/drive such that the entire section of film contacting the main cylinder is replaced with a new, clean section of film. In other scenarios it may be beneficial to perform smaller movements of film on a more frequent basis, where the entire section film is not replaced all at once, but rather in small sections over a longer period of time.

The clean and dirty spools may be as simple as a cylinder, or they may be a more traditional "spool" shape with a small inner cylinder and large flat flanges on the top and bottom to prevent spooled film from slipping off the cylinder. Such spools can be made from plastic, metal, or other suitable materials and may or may not contain a bushing or bearing to secure the spool in position. The spools may be mounted with their main axes in a vertical position, with the film being pulled horizontally across the transparent main cylinder. Depending on the design, the spools may be mounted either vertically or horizontally. When the spools are mounted horizontally, the sacrificial transparent film is pulled vertically across the transparent main cylinder; when the spools are mounted vertically, the sacrificial transparent film is pulled horizontally across the transparent main cylinder.

The invention provides a means of providing tension to the sacrificial transparent film by using a spring or alternative mechanism similar to the drag system on a fishing reel for keeping the film wrapped tightly around the clean spool. This prevents the problem where the spool unravels loosely around the clean spool. Another option is to have a friction wheel, spring lever, pawl, pawl and cog wheel, or friction spring damper that prevents the clean spool from free spinning too easily. Another option is to have a metal wire with some tension to apply to the film, just enough to keep it from unraveling but not too tight to prevent the spool from spinning when the motor pulls new film out from it.

In another embodiment, there is sufficient sacrificial transparent film installed on the clean spool to allow many actuations of the motor before replacement of the film is necessary. At some point, all of the film will have progressed from the clean spool to the dirty spool, and the film will need to be replaced with new film being wrapped around the clean spool and then positioned again in front of the transparent main cylinder and over to the dirty spool. The replacement mechanism for the spools can be any method that allows for quick and simple replacement similar to those techniques used in film-based cameras by Nikon, Leica, Voiglander, Lomography, Fujifilm, Holga, Kodak or Polaroid.

The instant invention provides a self-cleaning mechanism that comprises of several primary components: 2 spools, a length of sacrificial transparent film, a drive mechanism, a mounting surface, and all required brackets and fasteners. Of the 2 spools, one spool contains the clean unused section of sacrificial transparent film, hereby referred to as the source/clean spool. The other spool contains the dirty used section of film, hereby referred to as the destination/dirty spool. The destination spool is driven by the drive mechanism, typically a motor but other methods to drive the spool can be used such as air driven motor, electrically operated motor, a drive rotating mechanism, such as a spring driven device or a ratcheting linear drive, which rotates the destination spool. This drive mechanism may be directly connected to the spool, connected by a gearbox, connected by a belt or pulley drive, or may be connected by any other method that can cause the spool to rotate. The length of sacrificial transparent film is connected between the two spools by being wrapped around both spools in any clockwise or counter-clockwise fashion. Both spools are mounted to a common mounting surface using brackets and fasteners.

A unique aspect of the instant invention is that both spools are mounted to a common mounting surface forming a module. The preferred embodiment is to have an entire assembly/module "ready-to-go" such that the user only needs to replace the assembly/module and does not need to pull and attach any length of sacrificial transparent film—the sacrificial transparent film is already preloaded and attached between both spools "from the factory". This provides a module capable of being removed from the device and replaced with a new module which reduces maintenance time.

In another embodiment the spools are not connected to the same common mounting surface which means that the sacrificial transparent film has to be replaced separately and threaded onto the spools. However, in another embodiment, the sacrificial transparent film can be preloaded onto a clean spool and that clean spool can be replaced when changing sacrificial transparent film.

By creating a replaceable module, the maintenance cost of the instant invention is reduced. The replaceable module can be replaced as one unit, which eliminates time to replace and thread the sacrificial transparent film.

When the entire self-cleaning assembly/module is installed into the main device (containing the camera or other sensor, circuitry, main enclosure, etc.), the sacrificial transparent film is wrapped around a portion of the transparent main cylinder as described. This assembly is held in place and affixed to the main device by nature of screws, fasteners, latches, pins, or any other mechanism. The preferred method is to use latches or other hand-operated fasteners which allow for easy removal and replacement of the self-cleaning assembly without the need for tools or screwdrivers.

The instant invention module is an assembly consisting of 2 spools, a drive mechanism, and a sacrificial transparent film for easy replacement in a larger device or enclosure. The sacrificial transparent film is wrapped around a transparent main cylinder that houses the optical device.

The source/clean spool, which contains a large roll of sacrificial transparent film during normal operation, has a mechanism for providing tension on the film to prevent unraveling of the film. This mechanism may consist of a wire, tab, friction wheel, spring lever, pawl, pawl and cog wheel or friction spring damper. This device provides a drag feature to apply the tension and may be located either directly on or within the clean spool, or as part of the mounting surface that the clean spool attaches to.

When the self-cleaning assembly is attached to the main device, the sacrificial transparent film is held in place around the transparent main cylinder simply by the position of the spools relative to the transparent main cylinder and the tensions provided by the mechanism on the source spool and the overall system friction. Additionally, there may be wipers, gaskets, or other retaining supports used to hold the film in place such that the sacrificial transparent film is firmly held in place around the main transparent cylinder. These additional retainers are also another component of the self-cleaning mechanism assembly.

In addition to the primary components of the instant invention as described above, there may be various bearings, bushings, pins, clips, screws, and other standard fasteners used to hold these main components together.

The sacrificial transparent film can be wrapped in either direction around either spool (clockwise or counter-clockwise).

The clean spool may be further protected within the housing by enclosing the spool and sacrificial transparent film in a housing slightly larger than the spool with only a small thin slit through which the clean film can pass. The slit can also have a gasketing material that further protects the clean transparent film. This additional protection ensures dirt, dust, and chemical gasses/fluids do not prematurely adhere to the clean portions of the film. Furthermore, the general assembly composed of the optical device, transparent main cylinder, 2 spools, motor, clean spool housing, and sacrificial transparent film may be further enclosed and contained from the remainder of the electrical equipment located in the main housing. In this embodiment, power and data cables will need to exit this intermediate housing so they can be connected to the other electrical components in the main housing.

In another embodiment, the general assembly of the optical device, transparent main cylinder, clean and dirty spools, motor, clean spool housing, and sacrificial transparent film, along with their containment, may be located outside of the same main housing where the other electrical equipment is located, and in some cases may be many feet away and only connected by data and power transmission cables.

In another embodiment the motor actuates according to a signal provided by some external source, whether it be from a component located inside the main housing or by some external source, such as via the pressing of a button located outside the housing or via sending a signal over the main data line that leaves the main housing. The decision to actuate the motor may be made by a person or operator pressing a button, a setting switch to an alternate position, a set of key strokes on a keyboard or by a set schedule or timer or by an image processing algorithm such as an artificial intelligence algorithm or rules-based image processing algorithm residing on a microprocessor, which is in communication with the optical device. In the case of the motor being triggered by an image processing algorithm, the algorithm may be analyzing multiple images over time to determine or detect contamination or occlusion of the field of view of the optical device, or it may be able to make such a determination with only a single image.

The microprocessor is in communication with the drive system and is also capable of communicating with a cloud application or other networked devices for storage in a cloud or a network database and processing of the video and other data. The cloud or network-based application receives data from the optical sensor and the microprocessor, and then provides database storage of raw data, and optionally processes and stores additional data. The cloud or network-based application also allows the operators of the system to review and evaluate situations being observed by them at the installed device site. This application may exist at the same physical location as the instant invention, this configuration commonly referred to as on-premises, LAN, local network, or it may exist on devices accessed via the public internet, located in the cloud, or via some hybrid combination of various networking configurations.

The instant invention is equipped with a microprocessor that can alternatively be an onboard chip capable of performing specialized computations to detect and classify objects or segments of interest from images or other data captured by the camera, laser, or other onboard sensor. These specialized computations are often referred to as Artificial Intelligence (AI), Deep Learning, or Machine Learning, due to the nature of the computations and the methods by which they work. By performing these computations directly on the hardware within the device, also known as being computed "at the edge", this reduces the overall system complexity when multiple such devices are present at a similar location. Without this edge computing capability, data needs to be transmitted from every device to a central computing location. If the data is from a camera sensor or a high-resolution laser sensor, for example, the bandwidth can be very high, especially when multiplied by a large number of devices. Additionally, the central computing device(s) (cloud-based server, cloud database, local computer, GPU cluster, etc.) must be capable of ingesting this large bandwidth as well as being able to perform these specialized AI computations in a suitable time frame. In addition to the large bandwidth, there is additional latency or delay when transmitting data to a central location for AI computing. By computing at the edge, these computations can be performed in real-time with very low latency.

The instant device is typically used as part of a larger system or platform where users are able to perform many functions necessary for managing the devices and observing the raw data and AI outputs from these devices. Some of the functions that users can perform include viewing real-time data streams (i.e., video feeds or 3D point clouds), viewing real-time detections of objects in the data streams (i.e., viewing the bounding boxes around detected vehicles in a video), viewing device statistics (device temperatures, available memory, available disk space, etc.), uploading new AI models, viewing previously recorded or stored data/videos, etc. A point cloud is a set of data points in space. The points represent a 3D shape or object. Each point has its set of X, Y and Z coordinates. Point clouds are generally produced by 3D scanners or by photogrammetry software, which measure many points on the external surfaces of objects around them.

The hardware on the device allows for a large amount of flexibility in the number and type of AI models or computations that are to be performed. For example, on a single device, there can be an embodiment that detects cars and people in an image, and then further classifies the cars by make and model. Meanwhile an additional embodiment can be running to track the movement of a specific person. Using the platform, these embodiments can be updated remotely, either with newer, better-performing versions of software, or with an entirely new set of devices. This allows for a highly flexible set of sensors that are capable of being used for multiple purposes and are dynamic according to the desires of the user.

In addition to performing detections or classifications within the data captured by the sensor, this device is also capable of detecting when the film is dirty and needs to be cleaned via the data obtained by the sensor. This is done using the onboard chip that is also used for the other AI computations. When a dirty sacrificial transparent film condition is detected, the onboard microprocessor or chip is able to send a signal to the drive to advance the sacrificial transparent film. The onboard microprocessor or chip is also capable of enabling an air purge, enabling the vibratory motor, or enabling any other onboard method of cleaning or advancing the film.

The instant invention has the ability to interact with other "low-level" peripherals. In addition to activating the onboard methods of cleaning or advancing the film, this device is also capable of sending an external signal directly to a number of other low-level peripherals. For example, this device can be connected to an external relay which enables a siren or light to activate when a specific condition is detected via the onboard AI chip. It can also be used to output a simple signal to an industrial Programing Logic Controller (PLC) control system to actuate a valve or control another piece of equipment. This ability is possible via an onboard microprocessor or chip and associated circuitry and a physical connection to the external peripheral. The benefit is that this does not require any additional sophisticated computers or devices to parse or interpret the data from the AI detections/classifications. These low-level peripherals can be triggered directly from the device.

An additional feature is that the device of the instant invention is capable of being powered over ethernet, thus reducing the number of cables required for installation, and thereby reducing the overall cost of implementation. In some scenarios where "Power Over Ethernet" is not available, the device may be powered via a separate power connection by localized solar panels and/or associated storage methods, such as batteries.

The instant invention is uniquely positioned for use in remote locations. There may be scenarios where the device needs to perform AI detections/classifications in a remote environment where access to data and power is limited. In these scenarios, it may be necessary to utilize a solar panel and battery, or to utilize a cellular data connection to transmit data. The benefit of using a "computing at the edge" platform is that the device is capable of performing high-level computations on the raw data stream while being able to send a low-bandwidth output, consuming very little data and power.

In another embodiment the instant invention could also be configured to be a device that has a sacrificial transparent film with vibrating motors, connections for air, connections for cleaning fluid, and an attachment for a physical wiper. These secondary mechanisms provide alternative solutions to remove the many different types of contaminants which can affect the field of view. By providing these different solutions the instant invention can improve the time between maintenance task by utilizing multiple methods of keeping the film or optical, laser or radar path clean. The instant invention therefore can be configured to have only a film and nothing else and it can also incorporate a combination of multiple methods of cleaning into one device. This provides the customer significant advantages to utilize the technology for cleaning the instrument path.

Additionally, the sacrificial transparent film could have a color/metal indicator near the end of the film to indicate "end of life" for the film. The device would have either a conductivity sensor to sense the metal indicator or a through beam sensor to detect the change in color or lack of transparency of the film. In an alternative configuration the camera could be used to detect the end of film indicator. In another alternative embodiment, the remaining length of film could be computed from the total elapsed time that the motor was actuated. In this configuration, an alert or notification could be triggered from the microprocessor or related software letting the user or operator know that there is a low remaining length of clean film remaining.

Referring now to the drawings FIGS. 1-6, and more particularly to FIG. 1, there is shown the assembly view showing camera or optical device 50 which is housed in enclosure 100, exposed sacrificial transparent film 110 over the transparent main cylinder through window 120. The sacrificial transparent film 110 is proximal to the camera or optical device enclosure 100 window 120 and transparent main cylinder 210 shown in FIG. 2 such that edge 101 of camera or optical device enclosure 100 is between enclosure 100 window 120 and sacrificial transparent film 110. Alternatively, the enclosure 100 window 120 can have a seal 102 to seal the interior and allow the sacrificial transparent film 110 to be exposed to the outside of the enclosure 100 and minimize the access to the interior of enclosure 100 to the environment outside of enclosure 100. The seal 102 can be formed from any material such as metal, rubber, vinyl, plastic or brush material.

Figure 2:
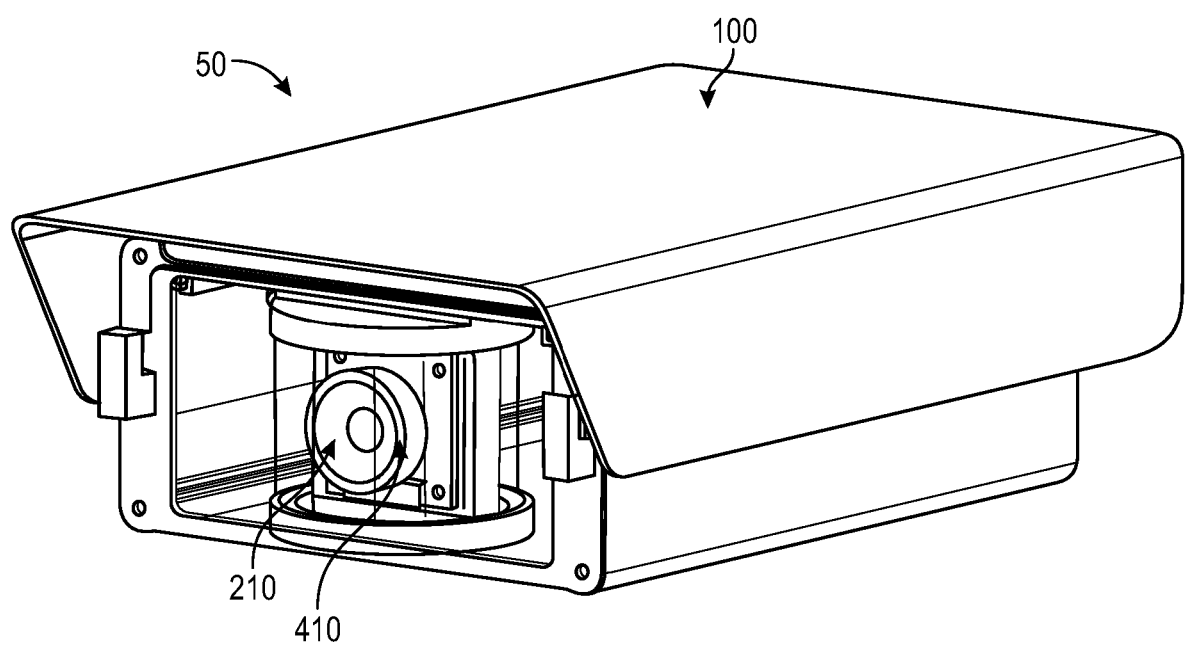
FIG. 2 is a full assembly without a front protective cover.

In FIG. 2 there is shown the assembly view showing camera or optical device 50 with optical device 410 which is housed in enclosure 100 and the transparent main cylinder 210.

Figure 3A:
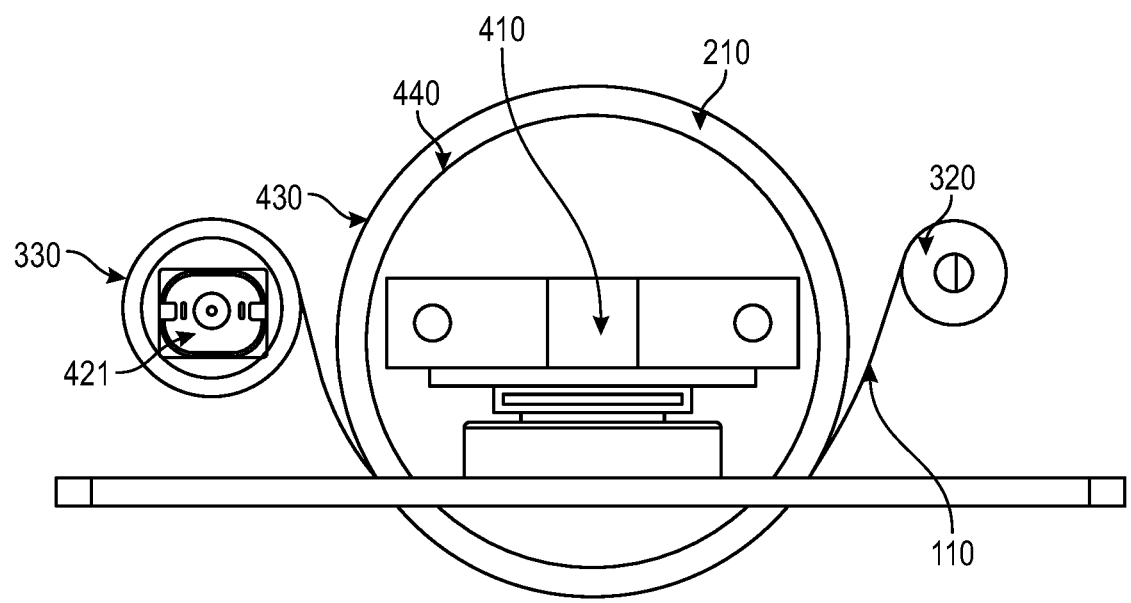
FIG. 3A is a plan view showing the path of the sacrificial transparent film over the main cylinder without wipers.
Figure 3B:
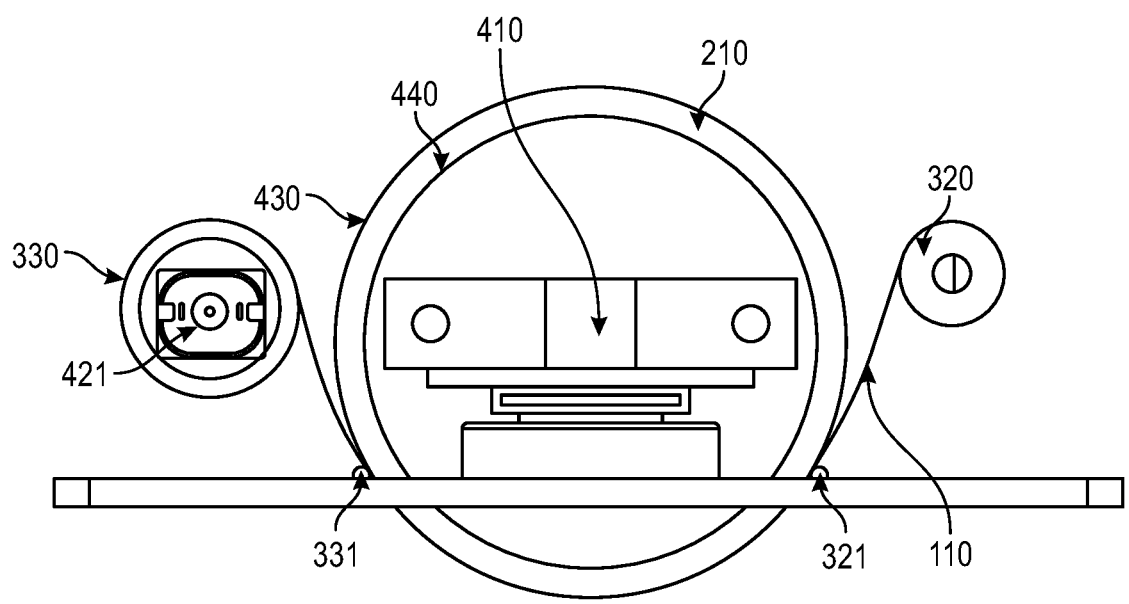
FIG. 3B is a plan view showing the path of the sacrificial transparent film over the main cylinder with wipers.
Figure 3C:
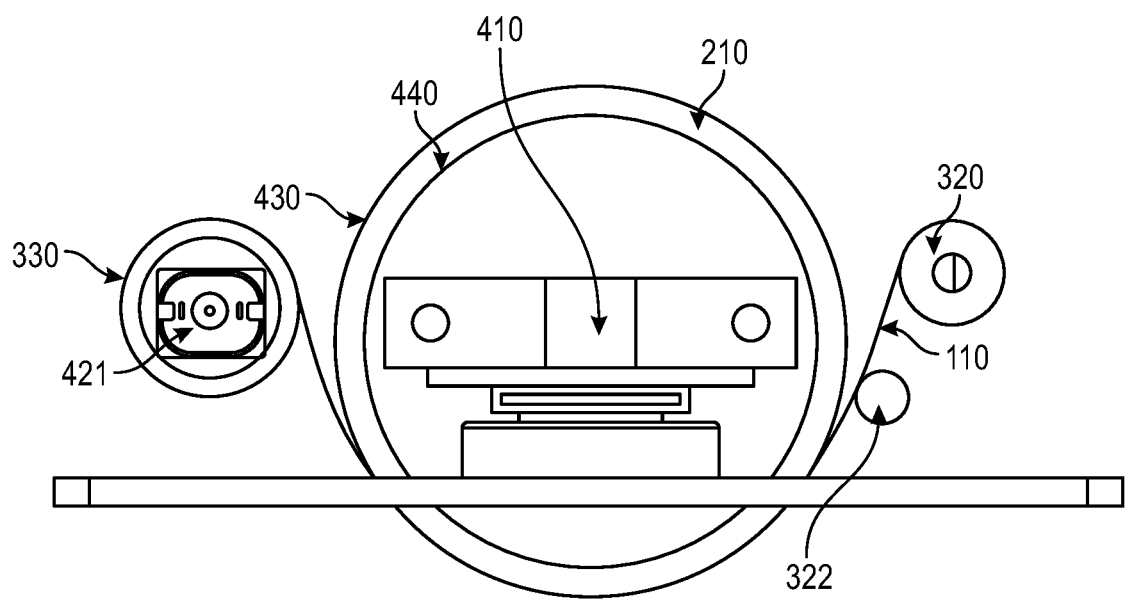
FIG. 3C is a plan view showing the path of the sacrificial transparent film over the main cylinder without wipers and a vibratory motor.

In FIGS. 3A, 3B and 3C there is shown plan views of the different embodiments of the instant invention showing the transparent main cylinder 210 with inner surface 440 and the outer surface 430, the clean spool 320, the dirty spool 330 and the sacrificial transparent film 110 wrapped around the transparent main cylinder 210. Wipers or seals 321 and 331 forces the sacrificial transparent film 110 around the transparent main cylinder 210 which minimizes the ability of chemical vapors to damage the transparent main cylinder 210. Clean wiper or seal 321 and Dirty wiper or seal 331 are optional. When used the wipers or seals 321 and 331 can be formed from any material such as metal, rubber, vinyl, plastic or brush material. The optical device 410 shown in FIG. 2 using a microprocessor having an artificial intelligence or image processing algorithm that senses an obstruction from analysing the data captured by the optical device. The microprocessor with the artificial intelligence algorithm can index the drive such that a clean area of the sacrificial transparent film 110 is positioned in front of the optical device. An obstruction can be any of the following that obstructs the optical device's view including dirt, contaminants, dust, chemicals, or other physical obstruction caused by chemical action. The transparent main cylinder 210 can be made from acrylic, polycarbonate, polyvinyl chloride, Lexan or glass.

The onboard microprocessor or chip is also capable of enabling a vibratory motor 322 for cleaning the sacrificial transparent film 110.

Figure 4:
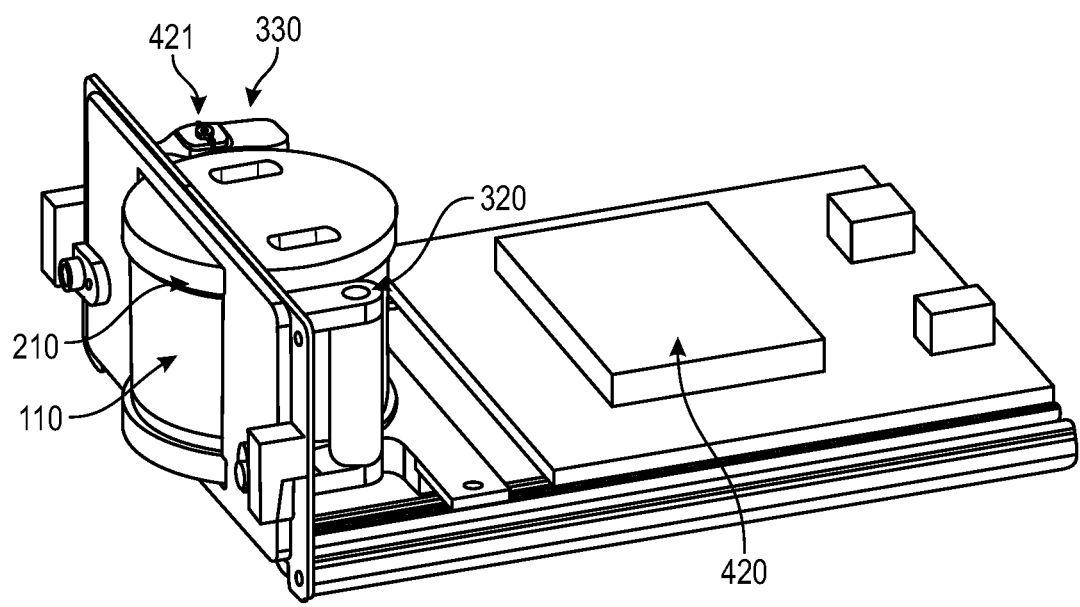
FIG. 4 is an isometric view of the inner assembly as seen from the back of the device.

In FIG. 4 there is shown an iso view of the inner assembly showing the transparent main cylinder 210 with sacrificial transparent film 110, the dirty spool 330, clean spool 320, drive 421 and the artificial intelligence computing device 420 having a microprocessor. The artificial intelligence computing device 420 utilizes a program that analyzes the images/data set or video stream taken by the optical device 410 shown in FIG. 2 and determines if the optical device lens is obstructed over time, by either dirt or chemical action. If the program determines that the optical device lens is obstructed by either dirt or chemical action, it signals the drive to index the sacrificial transparent film 110. The inner surface 440 and the outer surface 430 of the transparent main cylinder 210 are shown FIG. 3A. The optical device 410 can be selected from the following devices such as a camera, an infra-red detector, a lidar detector, radar detector or sonar detector. Drive 421 can be selected from any of the following: an electrically operated motor, a drive rotating mechanism, such as a spring driven device, or a ratcheting linear drive.

Figure 5:
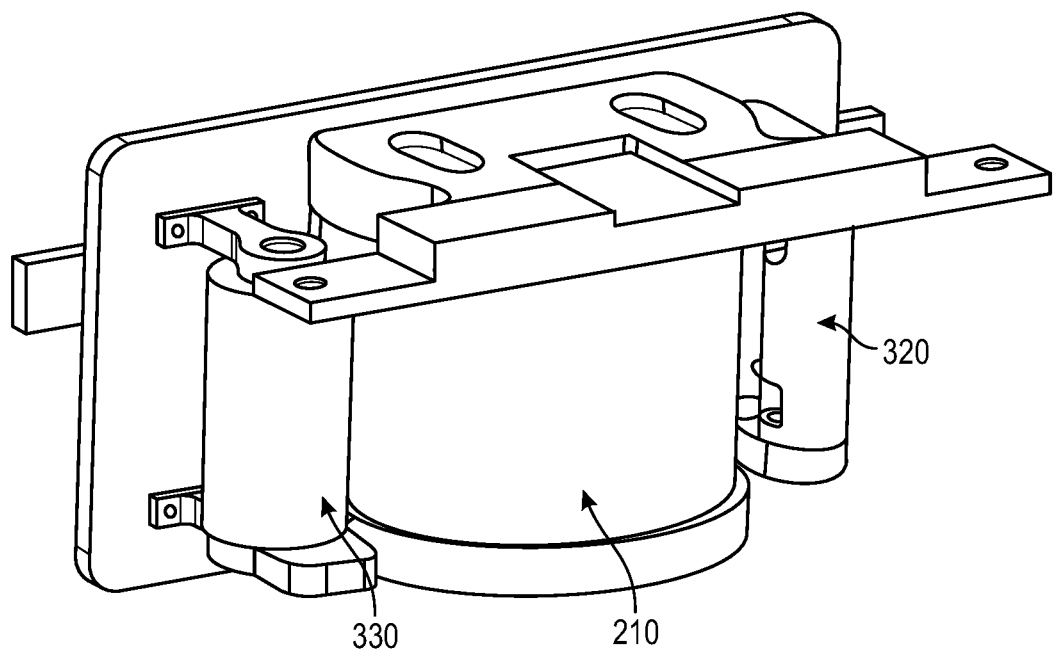
FIG. 5 is an isometric view of the inner assembly as seen from the back of the device.

In FIG. 5 there is shown an iso view of the inner assembly from the rear showing the transparent main cylinder 210, the dirty spool 330, clean spool 320.

Figure 6:
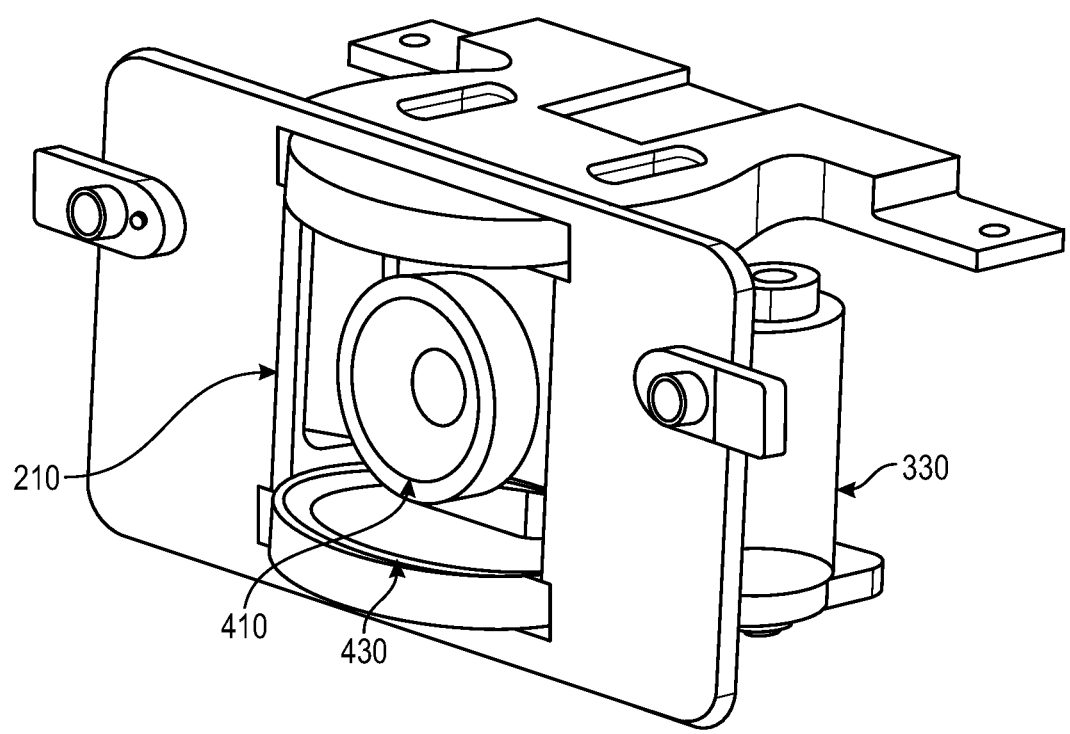
FIG. 6 is an isometric view of the inner assembly as seen from the front of the device.

In FIG. 6 there is shown an iso view of the inner assembly showing the main cylinder 210 with the outer surface 430, the dirty spool 330, the optical device 410.

Figure 7:
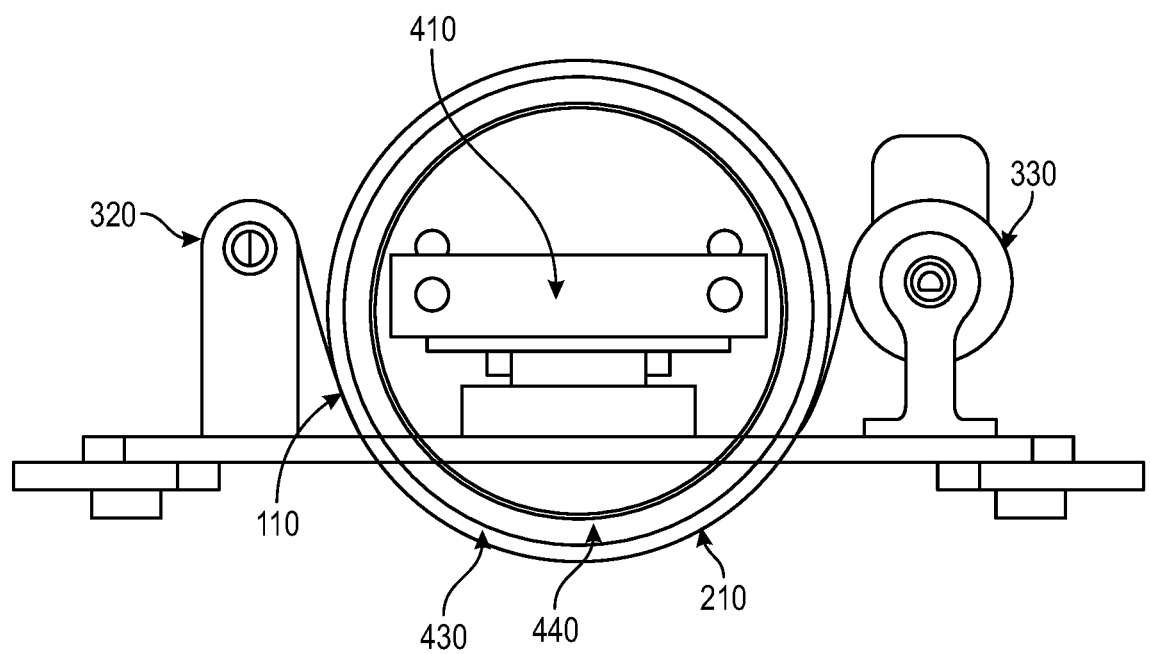
FIG. 7 is an inner spool assembly.

In FIG. 7 there is shown a plan view of the inner assembly showing the transparent main cylinder 210, the dirty spool 330, the clean spool 320 and the optical device 410. The inner surface 440 and outer surface 430 of the transparent main cylinder 210 are shown. This shows an alternative embodiment that does not have wipers 321 and 331. The module shown in FIG. 7 can be mounted within an enclosure 100 such that the sacrificial transparent film 110 is mounted either in the vertical or horizontal configuration. In the vertical configuration the clean spool 320 is preferably mounted above the optical device 410 and the dirty spool 330 is preferably mounted below the optical device 410. However, the spools can be mounted in any manner that is useful to the installation.

Figure 8:
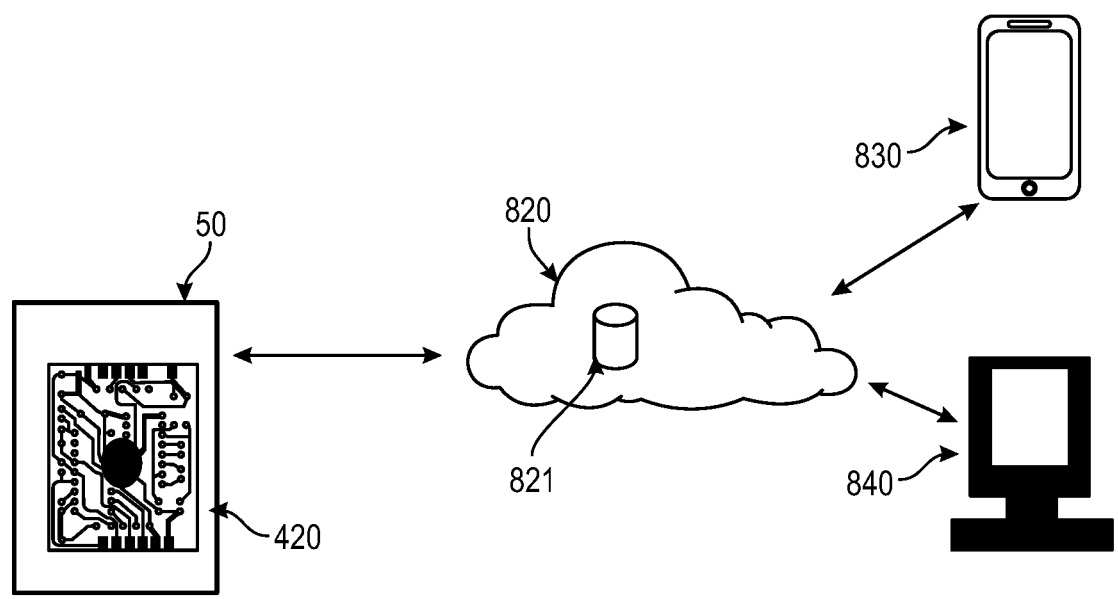
FIG. 8 is a schematic of the software platform and network communication methods.

Referring now to FIG. 8 which shows the basic device in communication with a cloud communication system or broader network of devices, some of which may be located physically near the device or may be located elsewhere and connected via internet. The device 50 with the artificial intelligence computing device 420 contains a microprocessor which is in communication with the cloud 820 and cloud storage device, network and any network storage devices 821. The communication method can be either wireless or wired. The cloud 820 and cloud storage device 821 are in communication with mobile devices 830 or computers 840. The mobile devices 830 or computers 840 are used by the system operators to monitor the device 50 and the software is capable of providing or downloading instructions either from the cloud/network and any network storage devices to the device 50 or from the device 50 to the cloud/network and any network storage devices. The wireless communications can be selected from Bluetooth, Bluetooth Low Energy, ANT, ANT+, WIFI, Zigbee, other wireless connection or any similar Personal Area Networking (PAN) technology. When wired connection is used, that communication protocol such as ethernet, USB, USB-A, USB-C, Lightning connector to USB, or other wired connection can be used. WIFI standards which are applicable for the system modules include but are not limited to IEEE 802.11 using frequencies such as 2.4 GHz and 5 GHz.

Figure 9:
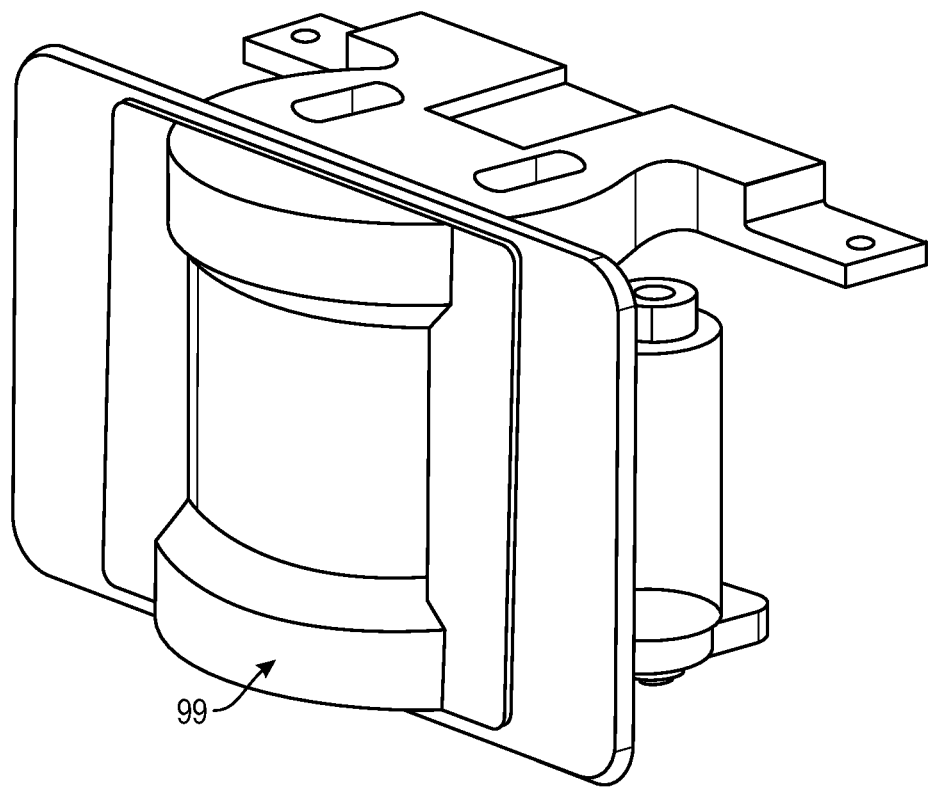
FIG. 9 shows the device of the instant invention with a guard bezel.

FIG. 9 shows an alternative embodiment of the instant invention with a guard bezel 99 to protect the instant invention from the surrounding environment.

An alternative embodiment of the instant invention for keeping the field of view of an optical device clean comprises of an optical device located within a transparent main cylinder; the transparent main cylinder having an outer surface and an inner surface, and the inner surface being proximal to the optical device; the transparent main cylinder being wrapped in a rotatable manner by a sacrificial transparent film around the outer surface of the transparent main cylinder such that the sacrificial transparent film is in communication with a clean spool and a dirty spool; a clean wiper located between the transparent main cylinder and the clean spool and the clean wiper in communication with the sacrificial transparent film; a dirty wiper located between the transparent main cylinder and the dirty spool and the dirty wiper in communication with the sacrificial transparent film; a drive in communication with the dirty spool such that when the drive is activated the dirty spool rotates and the sacrificial transparent film wraps around said dirty spool and the rotatable sacrificial transparent film unwraps around the clean spool; the sacrificial transparent film moves over the outer surface of said transparent main cylinder when the sacrificial transparent film wraps around the dirty spool; the optical device being in communication with a microprocessor having an having a software application running various artificial intelligence or image processing algorithms and in communication with the drive; the optical device taking at least one image or digital data set; the software application analyzes at least one image or digital data set to determine if the optical device is obstructed by an obstruction, and if obstructed by an obstruction, the microprocessor signals the drive to index the sacrificial transparent film.

In some embodiments, the system, method or methods described above may be executed or carried out by a computing system including a tangible computer-readable storage medium, also described herein as a storage machine, that holds machine-readable instructions executable by a logic machine such as a processor or programmable control device to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, game controllers, video camera, camera, keyboard, or gaming controller. For example, a user input may indicate a request that certain tasks are to be executed by the computing system, such as requesting the computing system to display any of the above described information, or requesting that the user input updates or modifies existing stored information for processing or requesting that the motor or drive mechanism is activated to move the sacrificial film. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claims. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for keeping the field of view of an optical device free from contamination from dirt, chemical gases, vapors and fumes comprising:
    said optical device located within a transparent main cylinder and said transparent main cylinder contained in an enclosure and said enclosure having an enclosure interior and enclosure exterior;
    said transparent main cylinder having an outer surface and an inner surface and said inner surface being proximal to said optical device;
    said transparent main cylinder being wrapped in a rotatable manner by a sacrificial transparent film around said outer surface of said transparent main cylinder such that said sacrificial transparent film is in communication with a clean spool and a dirty spool;
    a wiper located between said transparent main cylinder and said clean spool and said wiper in communication with said sacrificial transparent film;
    said wiper located between said transparent main cylinder and said dirty spool and said wiper in communication with said sacrificial transparent film;
    a seal configured to allow moveable sealing of said sacrificial transparent film to said transparent main cylinder so that said seal is able to seal said enclosure interior from said enclosure exterior and said seal separates said enclosure interior from said enclosure exterior in such a way that the seal prevents dirt, chemical gases, vapors and fumes from entering into said enclosure, said seal is selected from one of caulking, O-ring, gasket, or adhesive, and said seal is in communication with said sacrificial transparent film;
    a drive in communication with said dirty spool such that when said drive is activated said dirty spool rotates and said sacrificial transparent film wraps around said dirty spool and said sacrificial transparent film unwraps from said clean spool;
    said sacrificial transparent film moves over the outer surface of said transparent main cylinder when said sacrificial transparent film wraps around said dirty spool;
    said optical device being in communication with a microprocessor having a software application and in communication with said drive;
    said optical device taking at least one digital data set; and
    said software application analyses said at least one digital data set to determine if said optical device is obstructed by an obstruction and if obstructed by said obstruction said microprocessor signals the drive to index the sacrificial transparent film.

2. The device of claim 1 wherein said obstruction is selected from the group consisting of dirt, chemical contamination, gases contamination, vapor contamination and fumes.

3. The device of claim 1 wherein said the drive is selected from the group consisting of an electrically operated motor, a drive rotating mechanism such as a spring driven device or a ratcheting linear drive.

4. The device of claim 1 wherein said sacrificial transparent film is selected from the group consisting of polyester, polyvinyl chloride, cellulose acetate, cellophane, Mylar®, Grafix Clear-Lay® and polypropylene.

5. The device of claim 1 wherein said software application is an artificial intelligence application that detects a dirty sacrificial transparent film.

6. The device of claim 1 wherein said sacrificial transparent film is in communication with said clean spool and said dirty spool and forms a module which can be removed from said device and replaced with a new module.

7. A device for keeping the field of view of an optical device free of contamination from chemical gases, chemical vapors and chemical fumes comprising:
  said optical device located within a transparent main cylinder and said transparent main cylinder contained in an enclosure and said enclosure having an enclosure interior and enclosure exterior; said transparent main cylinder located in said enclosure with a window and said window having at least one seal;
  said transparent main cylinder having an outer surface and an inner surface and said inner surface being proximal to said optical device;
  said transparent main cylinder being wrapped in a sacrificial transparent film around said outer surface of said transparent main cylinder such that said sacrificial transparent film is in communication with a clean spool and a dirty spool and said sacrificial transparent film minimizes the obstruction of said contamination from chemical gases, chemical vapors and chemical fumes and damage to said transparent main cylinder;
  a drive in communication with said dirty spool such that when said drive is activated said dirty spool rotates and said sacrificial transparent film wraps around said dirty spool and said sacrificial transparent film unwraps from said clean spool;
  said rotatable sacrificial transparent film moves over the outer surface of said transparent main cylinder when said rotatable sacrificial transparent film wraps around said dirty spool;
  said at least one seal configured to allow moveable sealing said sacrificial transparent film to said transparent main cylinder so that said at least one seal is able to seal said enclosure interior from said enclosure exterior in such a way that the seal prevents dirt, chemical gases, vapors and fumes from entering into said enclosure, and said seal is selected from one of caulking, O-ring, gasket, or adhesive;
  said optical device being in communication with a microprocessor having a software application and in communication with said drive;
  said optical device taking at least one digital data set; and
  said software application analyzes said at least one digital data set to determine if said optical device is obstructed by said contamination and if obstructed by said contamination said microprocessor signals the drive to index the sacrificial transparent film.

8. The device of claim 7 wherein said drive is selected from the group consisting of an electrically operated motor, a drive rotating mechanism such as a spring driven device or a ratcheting linear drive.

9. The device of claim 7 wherein said sacrificial transparent film is selected from the group consisting of polyester, polyvinyl chloride, cellulose acetate, cellophane, Mylar®, Grafix Clear-Lay® and polypropylene.

10. The device of claim 7 wherein said digital data set is a digital image.

11. The device of claim 7 wherein said software application is an artificial intelligence application that detects a dirty sacrificial transparent film.

12. The device of claim 7 wherein said sacrificial transparent film is in communication with said clean spool, said dirty spool forms a module which can be removed from said device and replaced with a new module.

13. A device for keeping the field of view of an optical device free of contamination from chemical gases, chemical vapors and chemical fumes comprising:
  said optical device located within a transparent main cylinder and said transparent main cylinder contained in an enclosure and said enclosure having an enclosure interior and enclosure exterior;
  said transparent main cylinder having an outer surface and an inner surface and said inner surface being proximal to said optical device;
  said transparent main cylinder being wrapped in a rotatable manner by a sacrificial transparent film around said outer surface of said transparent main cylinder such that said sacrificial transparent film is in communication with a clean spool and a dirty spool and said sacrificial transparent film minimizes the effects of said contamination and damage to said transparent main cylinder;
  a drive in communication with said dirty spool such that when said drive is activated said dirty spool rotates and said sacrificial transparent film wraps around said dirty spool and said sacrificial transparent film unwraps around said clean spool;
  said rotatable sacrificial transparent film moves over the outer surface of said transparent main cylinder when said rotatable sacrificial transparent film wraps around said dirty spool;
  a seal configured to allow moveable sealing of said sacrificial transparent film to said transparent main cylinder so that said seal is able to seal said enclosure interior from said enclosure exterior and thereby seal said enclosure interior from said contamination from chemical gases, chemical vapors and chemical fumes, and said seal is selected from one of caulking, O-ring, gasket, or adhesive;
  said optical device being in communication with a microprocessor having software application and in communication with said drive;
  said optical device taking at least one digital data set;
  said software application displaying said at least one digital data set to an operator; and said operator determining if said optical device is obstructed by said contamination and if obstructed by said contamination said operator sends a signal to said software application and said software application signals the drive to index the sacrificial transparent film.

14. The device of claim 13 wherein said drive is selected from the group consisting of an electrically operated motor, a drive rotating mechanism such as a spring driven device or a ratcheting linear drive.

15. The device of claim 13 wherein said sacrificial transparent film is selected from the group consisting of polyester, polyvinyl chloride, cellulose acetate, cellophane, Mylar®, Grafix Clear-Lay® and polypropylene.

16. The device of claim 13 wherein said software application displays said digital data set to an operator and said operator has a means of providing a signal to said software application.

17. The device of claim 16 wherein said means of providing a signal to said software application is a person or operator pressing a button, a setting switch to an alternate position, a set of key strokes on a keyboard or by a set schedule or timer.

18. The device of claim 13 wherein said digital data set is a digital image.

* * * * *